United States Patent [19]

Corner

[11] Patent Number: 5,115,849
[45] Date of Patent: May 26, 1992

[54] TIRE TREAD PATTERN HAVING STEPPED SHOULDER

[75] Inventor: Michael R. Corner, Coventry, Great Britain

[73] Assignee: Sumitomo Rubber Industries, Ltd., Hyogo, Japan

[21] Appl. No.: 701,343

[22] Filed: May 9, 1991

Related U.S. Application Data

[63] Continuation of Ser. No. 413,764, Sep. 28, 1989, abandoned.

Foreign Application Priority Data

Oct. 8, 1988 [GB] United Kingdom ............... 8823690

[51] Int. Cl.⁵ .................. B60C 11/01; B60C 11/12
[52] U.S. Cl. .................... 152/209 R; 152/DIG. 3
[58] Field of Search ........ 152/209 R, 209 D, DIG. 3; D12/152

[56] References Cited

U.S. PATENT DOCUMENTS

| | | | |
|---|---|---|---|
| 2,779,060 | 1/1957 | Knox | 152/DIG. 3 |
| 4,480,671 | 11/1984 | Giron . | |
| 4,705,088 | 11/1987 | Ghilardi | 152/209 R |
| 4,739,812 | 4/1988 | Ogawa et al. | 152/209 R |
| 4,756,352 | 7/1988 | Ogawa et al. | 152/209 R |
| 4,798,236 | 1/1989 | Fujiwara | 152/209 R |
| 4,878,526 | 11/1989 | Ochiai | 152/209 R |
| 4,905,747 | 3/1990 | Ogawa . | |
| 4,926,919 | 5/1990 | Hopkins et al. | 152/209 R |

FOREIGN PATENT DOCUMENTS

| | | | |
|---|---|---|---|
| 2214602 | 8/1974 | France . | |
| 169836 | 9/1984 | Japan | 152/DIG. 3 |

*Primary Examiner*—Geoffrey L. Knable
*Attorney, Agent, or Firm*—Birch, Stewart, Kolasch & Birch

[57] ABSTRACT

A tire tread pattern for a radial ply heavy vehicle tire comprising at least two circumferentially extending continuous main tread grooves providing at each edge of the tread a shoulder rib characterized in that each shoulder rib comprises in its shoulder edge a narrow edge zone having, in cross section of the tire, a radial height at least 2 mm less than the ground engaging surface of the shoulder rib immediately adjacent to said edge zone and a junction zone between the edge zone and shoulder rib which is made flexible in both the transverse and circumferential directions by a series of circumferentially spaced narrow slots extending across the junction zone at an angle to the center line of the tread between 20 and 60 degrees, the slots having a width between 0.4 and 2.0 mm and the depth in the junction zone substantially the same as the main tread grooves.

5 Claims, 1 Drawing Sheet

TIRE TREAD PATTERN HAVING STEPPED SHOULDER

This application is a continuation of application Ser. No. 07/413,764 filed on Sept. 28, 1989, now abandoned.

BACKGROUND OF THE INVENTION

The present invention relates to a tire tread pattern and in particular to a pattern suitable for heavy vehicle radial ply tires such as those used on trucks and buses.

Modern vehicles run at high speeds often for very long distances, and radial ply truck tread patterns comprising two circumferentially extending main grooves providing in each of the tread edges a shoulder rib are prone to uneven wear at the very edges of the tread, i.e. the shoulders. This wear begins as a narrow step or 'drop' in the shoulder but progresses across the tire as the tire wears so that the step becomes wider and deeper. The step however often is uneven around the tire and this results in a reduction in tire performance and also a reduction in the effective ground contact patch area. The appearance of the tire becomes progressively more untidy and this makes it particularly difficult for the user to accurately assess the state of wear of the tire which means that the tire is not used fully and economically. Such treads may have circumferential ribs or rows of blocks between the shoulder ribs.

Previous attempts to solve this uneven and unpredictable shoulder wear have included restricting the tread contact width by forming a step in the shoulder but this reduces the cost effectiveness of the tire with respect to the useful tread area for wear. Effectively, the carcass size/cost for the tire is made larger than should really be necessary for the tread width and thus the tire is more expensive.

Another attempt in the prior art uses a narrow, circumferentially-extending, continuous decoupling groove adjacent to the tread edge to form a narrow rib which itself has a reduced radius to the main tread radius, so that it has a step appearance. This design, although it gives good consistent tire appearance through the wear life of the tire, has an unnecessary reduction in the work efficiency of the tread zone as it effectively makes the narrow shoulder rib a non working rib i.e. not contributing to tread life.

Accordingly, it is an object of the present invention to provide a tire tread which avoids the uneven edge wear problem but retains from that edge region of the tire a useful contribution to tire performance and resulting tread life.

SUMMARY OF THE INVENTION

According to one aspect of the present invention, a tire tread pattern for a radial ply heavy vehicle tire comprises at least two circumferentially extending continuous main tread grooves providing at each edge of the tread a shoulder rib wherein each shoulder rib comprises in its shoulder edge a narrow edge zone having, in cross section of the tire, a radial height at least 2 mm less than the ground engaging surface of the shoulder rib immediately adjacent to said edge zone and a junction zone between the edge zone and shoulder rib which section zone is made flexible in both the transverse and circumferential directions by a series of circumferentially spaced narrow slots extending across the junction zone at an angle to the center line of the tread between 20 and 60 degrees, the slots having a width between 0.4 and 2.0 mm and a depth in the junction zone substantially the same as the main tread grooves.

Preferably the shoulder edge zone has a width axially of the tire between 3 and 8 percent of the tread width, also the narrow slots more preferably are at an angle of 40 to 50 degrees to the center line of the tread. The slots may also have in addition to the position disposed at an angle between 20 and 60 degrees to the center line of the tread two wing zones each of which extend at 90 degrees to the center line of the tire such that these wing zones extend beyond the junction zone into the shoulder rib and edge zones respectively. Preferably the slots in the shoulder rib and edge rib zones have a depth less than the depth of the slot in the junction zone. The depth in the edge zones is preferably between 70 and 90 percent of the depth of the angled zone of the slots. The spacing between the slots around the tire is preferably such that the distance between adjacent pairs of slots is between 2 and 4 times the length of the angled portion of each slot.

BRIEF DESCRIPTION OF THE DRAWINGS

Further aspects of the present invention will become apparent from the following description, which is given by way of example only of one embodiment of the present invention.

Figure 1:
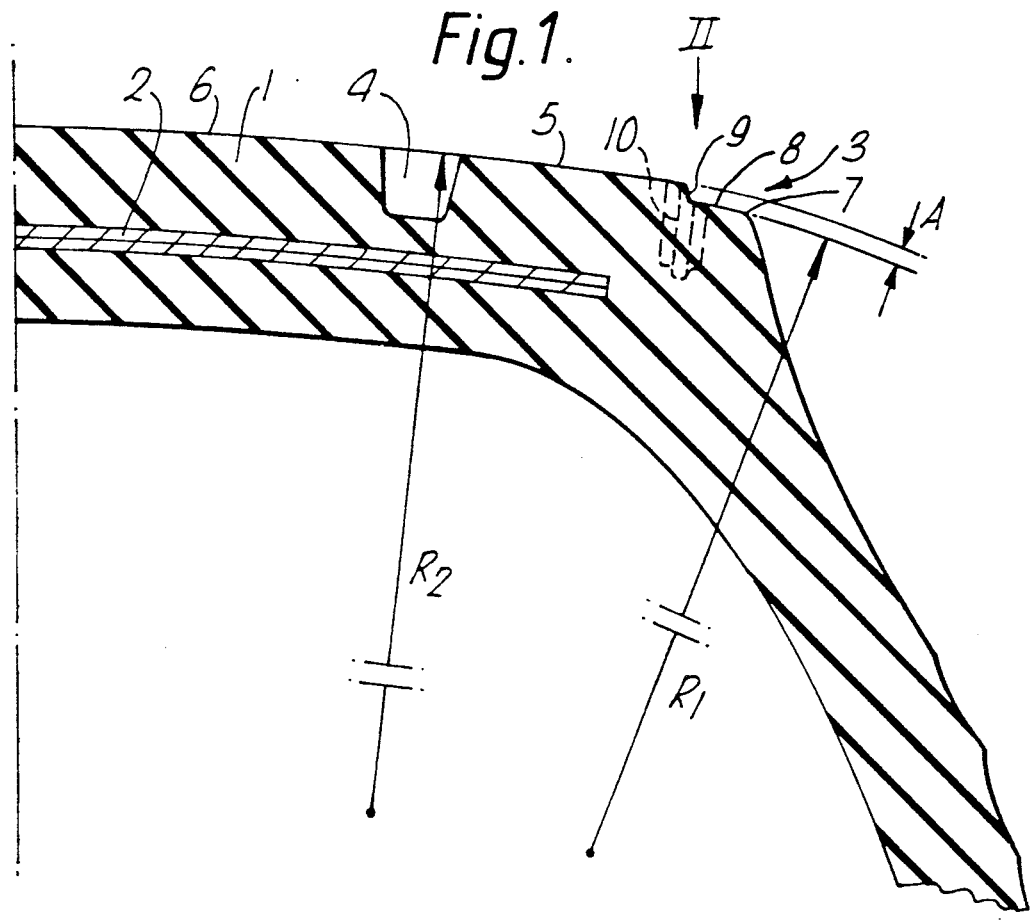
FIG. 1 is a partial cross section of a truck tire having a shoulder rib according to the present invention.

The tire shown in FIG. 1 comprises a truck tire having a tread region 1 reinforced by a breaker 2. The tread region 1 has adjacent to its shoulder region 3, a circumferentially extending main tread groove 4 which subdivides the tire tread to provide a shoulder rib 5 extending circumferentially of the tire. A similar shoulder rib is provided at each side of the tire although only one side of the tire is shown in FIG. 1. The central part 6 of the tire tread pattern may comprise a series of blocks or further circumferentially extending ribs, and this part of the tread forms no part of the present invention which relates to the shoulder rib 5.

Figure 2:
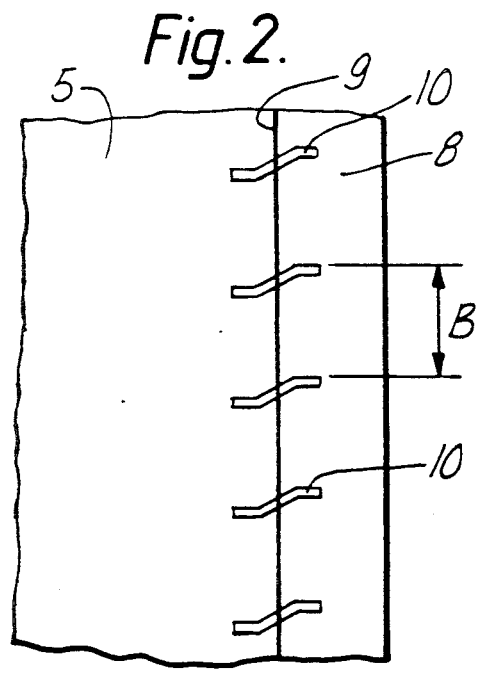
FIG. 2 is a plan view in the direction of arrow II of the shoulder region of the tire shown in FIG. 1.
Figure 3:
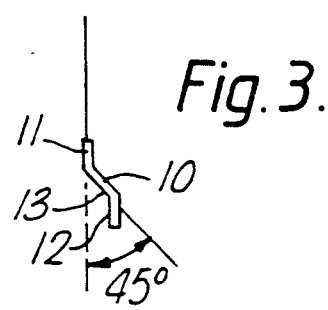
FIG. 3 is a detailed view of one narrow slot shown in the previous figures.

Each shoulder rib has at its shoulder edge 7 a narrow edge zone having a radial height a distance A which is 2 mm less than the height of the ground engaging surface of the shoulder rib immediately adjacent to the said edge zone 8. The stepped edge zone 8 has a width in this example of 10 mm and has a slightly curved surface in transverse cross section of the tire having the same radius of curvature R1 as the radius of curvature R2 of the central tread zone 5. The shoulder edge 8 has a steeply sloping junction zone 9 between the edge 8 and the shoulder rib 5. Across this junction zone 9 are positioned a series of circumferentially spaced basically transversely extending narrow slots 10. Each slot 10 has a Z or S shaped plan view as shown in FIGS. 2 and 3 positioned so that the two ends 11 and 12 of the narrow slot 10 are parallel but are joined together by a central region 13 which then extends at an angle of 45 degrees to the direction of the end regions 11 and 12. This central region 13 is arranged to traverse the junction zone 9 and extend into edge zone 8 and shoulder rib 5 at an angle of 45 degrees to the axial direction of the tire as shown in FIG. 2 such that the central region 13 is equally divided by the junction zone 9.

Figure 4:
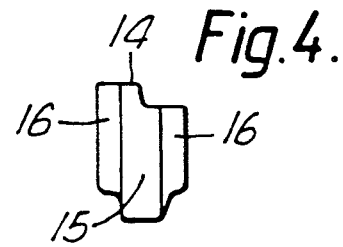
FIG. 4 shows the shape of the slot depth in forming the slot shown in FIG. 3.

Each narrow slot 10 is formed by a blade shown in FIG. 4 which is mounted in the tire mould used to form the pattern in the tread when the tire is moulded and vulcanised. Each blade has a stepped upper region 14 to provide for the step in the tread surface and is shaped in the Z shape of FIG. 3 in plan view. When looked at in the side view shown in FIG. 4 it can be seen that the center region 15 of the blade is longer than the edge regions 16. The resultant narrow slot 10 formed in the tire has the angled central region 13 extending deeper into the tread surface than the two side regions 11 and 12.

The spacing distance B between adjacent narrow slots 10 for a 11R22.5 truck tire is 8 mms so that the distance between adjacent pairs of slots is 2.7 times the length of the angled portion of each narrow slot 10.

The resultant structure provides a step region 8 at the edge of the new tire tread and in the junction region 9 the result of the angled slots is that the stiffness of the tire in the junction zone 9 in both the circumferential and axial directions of the tire is reduced so that the narrow stepped shoulder edge zone 8 is made more flexible from the junction zone 9 to the edge of the tire. Thus, in use of the tire, this more flexible edge zone is caused to move more upon the road surface than the remainder of the shoulder rib 5 and consequently this edge zone 8 wears more rapidly than the shoulder rib 5 which preserves the sharp line appearance at the edge of the rib 5 marked by the junction zone 9.

An important feature of the present invention however, is that the spacing of the narrow slots 10 and the angled central region of these slots allows the stiffness of the junction zone 9 in both the circumferential and transverse directions to be adjusted so that the wear effect mentioned above is obtained while retaining the substantial location of the shoulder region with respect to the shoulder rib 5 so that the shoulder region 8, when it contacts the road on the outer edge of the tire as fitted to a vehicle and the vehicle is cornered, has still sufficient stiffness, in the transverse direction, to contribute to the cornering power of the tire on the vehicle. Thus sufficient flexibility is given in the junction zone 9 to give a good wear appearance for the tire but there is still sufficient connection between the narrow edge region 8 and the main shoulder rib 5 for the tread to give good vehicle handling properties.

The slots in the tire are between 0.4 and 2 mm wide so that they have substantially no width but do provide decoupling to weaken the required region of the tread. This width is also one which is conventionally moulded into the tire tread by means of blades.

The angle of the central region 13 of each narrow slot 10 may be varied between 20 and 60 degrees to the axial direction of the tire dependent upon the particular transverse and circumferential stiffnesses required of the tire. The difference in depth of the narrow slots 10 between the end zones 11 and 12 and the central zone 13 also provide for further control of the relevant stiffnesses.

The present invention is particularly applicable to tires where the stepped edge region 8 has a width, axial of the tire tread of between 3 and 8%.

It should also be understood that the Z shaped slots may be simplified to straight slots which lie at a constant angle between 20 and 60 degrees to the centre line of the tread.

The depth of the narrow slots 10 may be the same as the depths of the main tread grooves 4 but more preferably the slots in the shoulder rib and edge rib zones have a depth slightly less than the depth of the slot of the junction zone.

Finally alternative spacings between adjacent pairs of slots may be used dependent upon the ratios of transverse and longitudinal stiffnesses required in the junction zone 9 to give the desired combination of tread wear properties and transverse stiffnesses to facilitate vehicle handling.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

Having now described the invention what we claim is:

1. A radial ply, heavy duty, vehicle tire having a tire tread provided with a tread pattern comprising
at least two circumferentially extending continuous main treads grooves providing at each edge of the tread a continuous shoulder rib wherein each shoulder rib comprises in its shoulder edge a narrow edge zone having a width axial of the tread in the range of 3 to 8% of the total tread width and having, in cross section of the tire, a radial height at least 2 mm less than the ground engaging surface of the shoulder rib immediately adjacent to said edge zone and a steeply sloping junction zone between the edge zone and the adjacent shoulder rib which is made flexible in both the transverse and circumferential directions by a series of circumferentially spaced narrow slots extending across the junction zone into the edge zone and the adjacent shoulder rib at an angle to the center line of the tread of between 20 and 60 degrees, said slots having a width of between 0.4 and 2.0 mm and a depth in the junction zone substantially the same as the main tread grooves, and said slots are spaced circumferentially around the tire such that the distance between each adjacent pair of slots is between two and four times the length of the angled portion of the slots.

2. The tire according to claim 1 wherein the narrow slots are disposed at an angle of between 40 and 50 degrees to the center line of the tread.

3. The tire according to claim 1 wherein each slot has in addition to its portion disposed at an angle between 20 and 60 degrees to the center line of the tread, two wing zones, each of which extend at 90 degrees to the center line of the tread.

4. The tire according to claim 3 wherein the wing zones are between 50 and 100 percent of the length of the angled regions of the slots.

5. The tire according to claim 3 wherein the wing zones of the slots have a depth between 50 and 90 percent of the depth of the angled slot region.